United States Patent
Morgan

(10) Patent No.: US 9,364,874 B2
(45) Date of Patent: Jun. 14, 2016

(54) APPARATUS AND METHODS FOR CAPTURING VAPORS EXITING A MATERIAL STORAGE COMPARTMENT OF A VESSEL

(71) Applicant: Baker Hughes Incorporated, Houston, TX (US)

(72) Inventor: Waynn C. Morgan, Alvin, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 121 days.

(21) Appl. No.: 14/444,368

(22) Filed: Jul. 28, 2014

(65) Prior Publication Data

US 2016/0023154 A1    Jan. 28, 2016

(51) Int. Cl.
*B08B 15/02* (2006.01)
*B65G 69/18* (2006.01)

(52) U.S. Cl.
CPC .............. *B08B 15/02* (2013.01); *B65G 69/18* (2013.01)

(58) Field of Classification Search
CPC ........ B01D 53/92; B63H 21/32; A01F 25/00; A01F 25/10; F01N 3/00; F23J 15/00
USPC ................... 55/385.1, 356, DIG. 18, DIG. 46; 60/281, 282, 283, 284, 285; 440/88 R, 440/89 R, 89 A, 113; 141/279, 387, 388; 110/121, 125, 216, 217; 114/187; 366/22, 25, 40
See application file for complete search history.

(56) References Cited

U.S. PATENT DOCUMENTS

| 5,158,204 | A | 10/1992 | Martrich et al. |
| 5,588,461 | A | 12/1996 | Plecnik |
| 7,258,710 | B2 * | 8/2007 | Caro ..................... B01D 53/92 110/121 |
| 8,402,746 | B2 * | 3/2013 | Powell ................. B63H 21/32 141/279 |
| 8,808,415 | B2 * | 8/2014 | Caro ..................... B63H 21/32 440/89 R |
| 2006/0032850 | A1 | 2/2006 | Theriot et al. |

FOREIGN PATENT DOCUMENTS

| EP | 1918631 A2 | 5/2008 |
| JP | 09-086591 A | 3/1997 |

* cited by examiner

*Primary Examiner* — Duane Smith
*Assistant Examiner* — Minh-Chau Pham
(74) *Attorney, Agent, or Firm* — E. Randall Smith; Jones & Smith, LLP

(57) ABSTRACT

A temporary hood for capturing vapors exiting from a material storage compartment of a vessel when the compartment is opened includes a base frame that extends around an opening to the compartment and is releasably secured to the vessel. An upper framework is releasably coupled to the base frame and extends upwardly from the vessel around the opening. A plurality of panels is releasably engageable with the upper framework and form an enclosure around the opening. At least one vapor discharge outlet fluidly communicates with the material storage compartment and a vacuum pump to allow the capture of vapors exiting from the opening when the cover is opened and the temporary hood is engaged with the vessel.

20 Claims, 3 Drawing Sheets

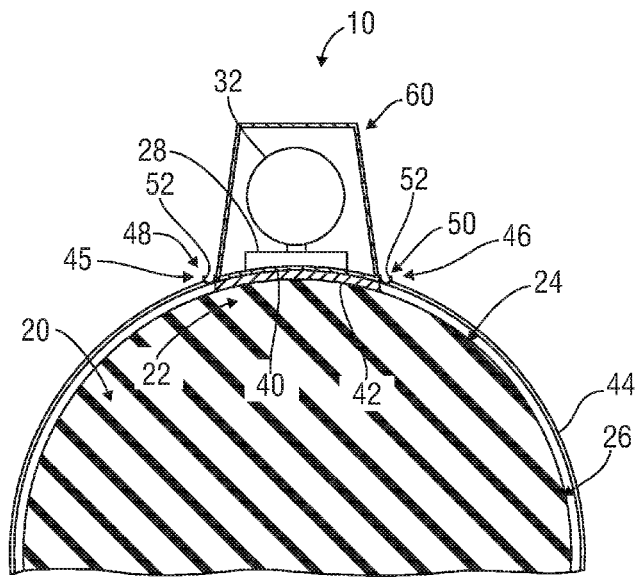
FIG. 1
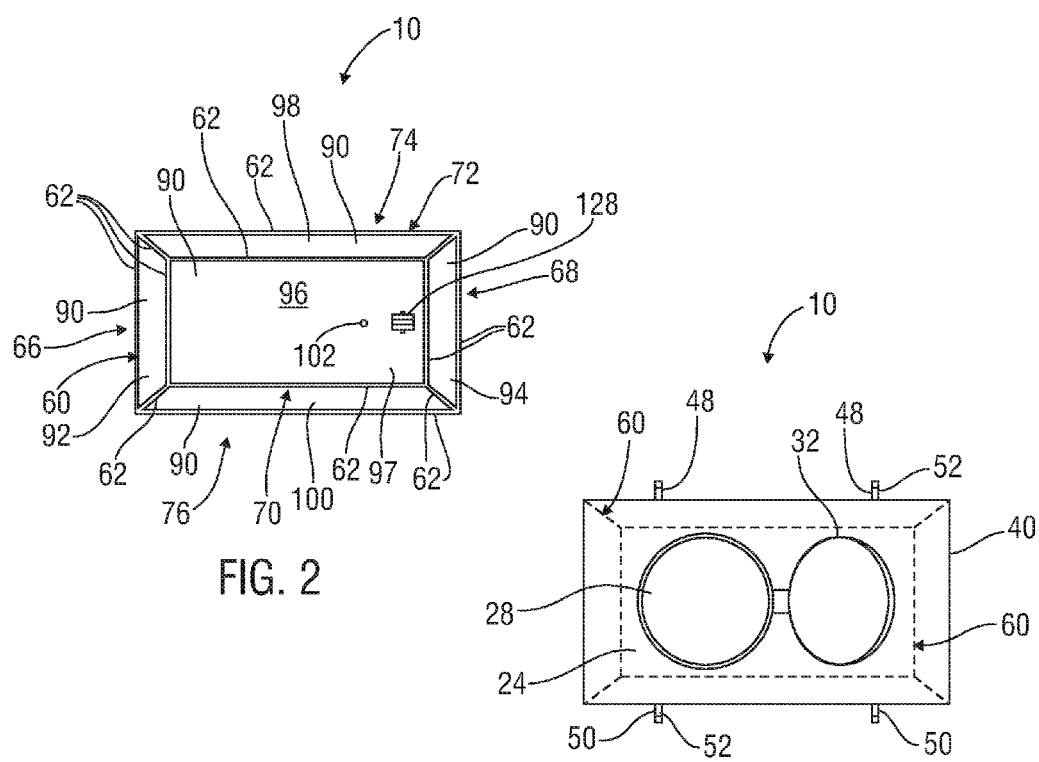
FIG. 2
FIG. 3

APPARATUS AND METHODS FOR CAPTURING VAPORS EXITING A MATERIAL STORAGE COMPARTMENT OF A VESSEL

FIELD OF THE INVENTION

The present disclosure relates generally to capturing vapors exiting a material storage compartment of a vessel.

BACKGROUND OF THE INVENTION

Various operations involve vessels (e.g. rail cars, trucks, boats, barges, etc.) having material storage compartments. The contents of the material storage compartments sometimes produce gas or vapors that could have an undesirable odor or may be potentially harmful, hazardous or toxic, if released into the atmosphere. In some cases, regulations or specifications provides specific limitations upon the release of certain gases or vapors into the atmosphere.

At various times, such as during off-loading the vessel, the vapors present in material storage compartment(s), or produced by the contents thereof, must be released or vented. Currently known techniques for off-loading contents of vessel material storage compartments are believed to have one or more disadvantages. For example, some known techniques simply allow the vapors to escape into the atmosphere. In many instances, if regulations or specifications limiting the release of particular substances into the atmosphere at the delivery location cannot be met, off-loading may be prohibited. When that occurs, substantial time, effort and cost may be incurred, such as when the vessel must return to its point of origin without off-loading its contents.

It should be understood that the above-described features and examples are provided for illustrative purposes only and are not intended to limit the scope or subject matter of the appended claims or those of any related patent application or patent. None of the appended claims or claims of any related application or patent should be limited by the above discussion or construed to address, include or exclude each or any of the cited examples, features and/or disadvantages, merely because of the mention thereof herein.

Accordingly, there exists a need for improved systems, apparatus and methods useful to assist in capturing vapors from the material storage compartment(s) of a vessel having one or more of the attributes or capabilities described or shown in, or as may be apparent from, the other portions of this patent.

BRIEF SUMMARY OF THE DISCLOSURE

In some embodiments, the present disclosure involves a temporary hood for capturing vapors exiting from a material storage compartment of a vessel when the compartment is opened. The vessel includes an opening into the top of the material storage compartment and a cover for covering and uncovering the opening. The temporary hood includes a base frame, an upper framework and a series of panels. The base frame is configured to extend around the opening and be releasably secured to the vessel. The upper framework is configured to be releasably coupled to the base frame and extend upwardly from the vessel around the opening. At least one releasable connector connects the upper framework to the base frame. A plurality of panels releasably engage the upper framework and form an enclosure around the opening. At least one vapor discharge outlet configured to fluidly communicate with the material storage compartment of the vessel and a vacuum pump to allow the capture of vapors exiting from the opening when the cover is opened.

Accordingly, the present disclosure includes features and advantages which are believed to enable it to advance material delivery technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein:

FIG. 1 is partial cross-sectional view of an embodiment of a temporary hood of the present disclosure shown disposed upon an exemplary train car;

FIG. 2 is a top view of an embodiment of temporary hood in accordance with the present disclosure;

FIG. 3 is another top view of an embodiment of temporary hood disposed on a carrier in accordance with the present disclosure showing the exemplary upper framework and panels in shadow;

DETAILED DESCRIPTION OF PREFERRED EMBODIMENTS

Figure 4:
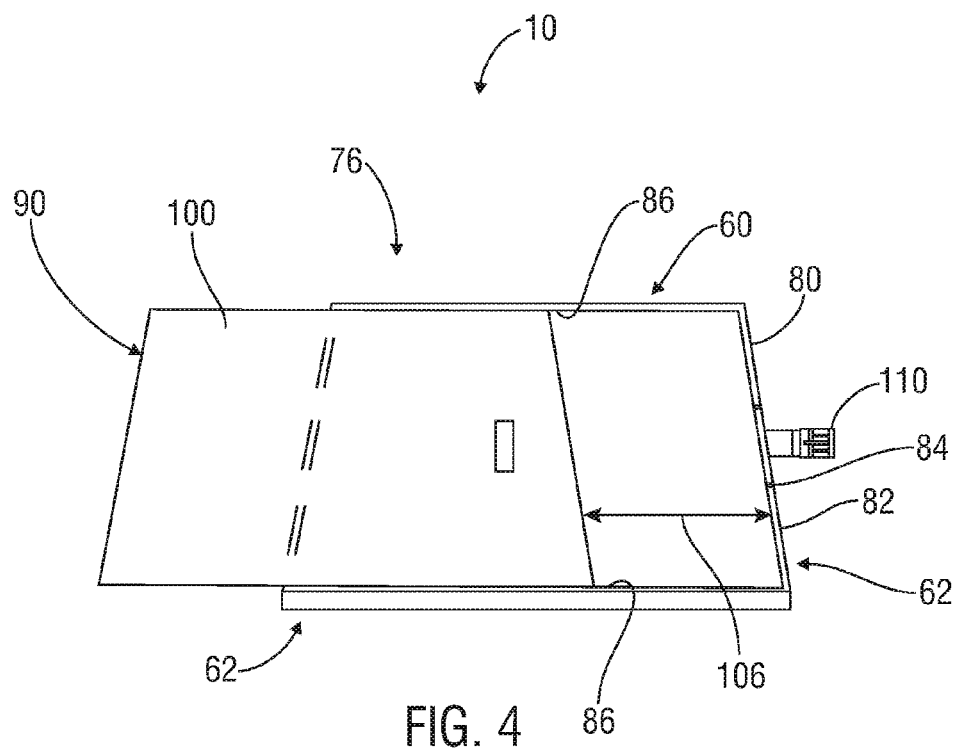
FIG. 4 is a side view of an embodiment of temporary hood in accordance with the present disclosure showing an exemplary side panel being slid into engagement with an exemplary upper framework.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and described preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms "coupled", "connected", "engaged" and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Referring initially to FIG. 1, an embodiment of a temporary hood 10 for capturing vapors exiting from a material storage compartment 20 of a vessel 24 when the compartment 20 is opened is shown. The illustrated vessel 24 includes an opening 28 into the top 22 of the material storage compartment 20 and a cover 32 for covering and uncovering the opening 28.

The vessel 24 may be any type of material carrier having at least one material storage compartment 20. In the present embodiment, the vessel 24 is a train car 26. However, depending upon the application, the vessel 24 may be a boat, barge or any other sea-going structure, or a truck, silo, trailer or any other land-moving structure. Thus, the present disclosure is not limited by the type or nature of the vessel 24.

Still referring to FIG. 1, the temporary hood 10 may have any suitable form, configuration and operation. In this embodiment, the hood 10 includes a base frame 40, an upper framework 60 and multiple panels 90 (e.g. FIG. 2). The exemplary base frame 40 is configured to extend around the opening 28 (e.g. FIG. 3) and be releasably secured to the vessel 24. The illustrated upper framework 60 is configured to be coupled to the base frame 40 and extend upwardly from the vessel 24 around the opening 28. The exemplary panels 90 (e.g. FIG. 2) are releasably engageable with the upper framework 60 and form an enclosure around the opening 28.

Figure 7:
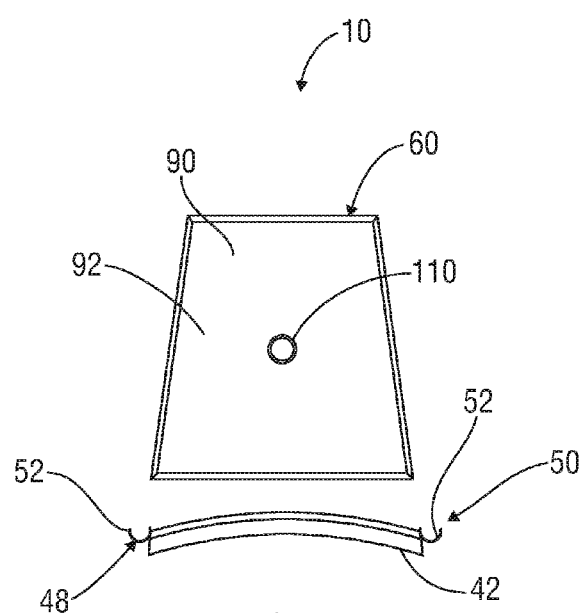
FIG. 7 is a front view of an embodiment of temporary hood in accordance with the present disclosure showing the exemplary upper framework and base frame disengaged.

The base frame 40 may have any suitable form configuration and operation. Referring to FIG. 3, in this embodiment, the base frame 40 has four sides formed generally in a picture-frame-like configuration to surround the opening 28 when placed upon the vessel 24. For example, four sections of metal rods, bars or strips may be welded together to form the base frame 40. If desired, the base frame 40 may be shaped to fit the particular shape of the vessel 24 or component thereof. In FIG. 7, for example, at least two sides of the illustrated base frame 40 have a curved shape to fit the contour of the train car 26 (e.g. FIG. 1). In other embodiments, the base frame 40 may have a different arrangement of parts. For example, in some embodiments, the base frame 40 may have only three sections formed in a triangle configuration.

The illustrated base frame 40 may be positioned around the opening 28 under any ladder, catwalk or other structure disposed upon the vessel 24 adjacent to the opening 28. If desired, the width and/or length of the base frame 40 may be adjustable relative to the opening 28, such as to accommodate different sized openings 28, types of containers 24 or operations. For example, referring to FIG. 5, one or more leg of the base frame 40 may be formed of multiple slideably-engaged sections 54, 56 to adjust the width or length of the base frame 40. Further, one or more releasable locking mechanisms 58 (e.g. bolt, spring-loaded pin, cotter pin, etc.) may be provided to secure the desired position of the sections 54, 56.

In some embodiments, the base frame 40 may be at least substantially sealingly engaged with the vessel 24 or one or more components thereof. As used herein, the terms "substantially" and variations thereof means completely, or a lesser amount that would be expected or could occur during typical operating conditions with typical equipment, parts and materials, but not under 90% of the referenced variable, element or limit. Referring back to FIG. 1, in this embodiment, at least one seal member 42 may be provided between the base frame 40 and the vessel 24. The seal member(s) 42 may have any suitable form and construction, such as one or more strips of two inch thick, compressible, foam rubber. However, other or additional materials, components or techniques may be used to substantially seal the interface of the base frame 40 and the vessel 24 or a component thereof, such one or more sealants.

The base frame 40 may be releasably secured to the vessel 24 (or one or more component thereof) in any suitable manner. For example, one or more straps 44 may be used to temporarily secure the base frame 40 to the vessel 24 and, if desired, ensure a stable and snug engagement of the seal member 42 or other sealing material (when included) between the base frame 40 and the vessel 24 (or component(s) thereof). As used herein, the terms "strap" and variations thereof means an elongated member configured to be connected to the frame 40 and secured to the vessel 24, or one or more component thereof. For example, in some applications, the strap 44 could be a wire, rope, harness, cord or the like, constructed of metal, rubber, plastic, leather, fabric, a combination thereof or any other suitable material.

Still referring to FIG. 1, the illustrated strap 44 is configured to be secured at its ends 45, 46 to the base frame 40 and wrapped around the diameter of the train car 26. For example, the base frame 40 may have first and second anchor members 48, 50 disposed on opposite sides of the opening 28 when the base frame 40 is positioned around the opening 28. In this embodiment, the anchor members 48, 50 are hooks 52. The hooks 52 may have any suitable form, configuration and operation. For example, the hooks 52 may be U-bolts welded to the base frame 40. If desired, multiple pairs of anchor members 48, 50 may be used. In FIG. 3, for example, two spaced-apart pairs of anchor members 48, 50 are shown.

The upper framework 60 may have any suitable form, configuration and operation sufficient to extend upwardly from the vessel 24 around the opening 28 and support the panels 90. In this embodiment, as shown in FIG. 2, the upper framework 60 includes a plurality of interconnected rails 62. The rails 62 may have any suitable construction. For example, the rails 62 may be metallic members. In the illustrated upper framework 60, the interconnected rails 62 forms a front frame section 66, rear frame section 68, top frame section 70, bottom frame section 72 and first and second side frame sections 74, 76. However, the upper framework 60 may have a different configuration. For example, the upper framework 60 may form an inverted V-shaped or tent-shaped vertical structure over the opening 28.

The rails 62 of the upper framework 60 may be interconnected in any suitable manner. For example, the rails 62 may be welded together. In some embodiments, the rails 62 may be interconnected so that the upper framework 60 is adjustable height-wise and/or width-wise relative to the opening 28. In the embodiment of FIG. 4, at least some of the rails 62 may be formed of multiple slideably-engaged sections 80, 82 to adjust the height and length of the framework 60. Further, one or more releasable locking mechanisms 84 (e.g. (e.g. bolt, spring-loaded pin, cotter pin, etc.) may be provided to secure the desired relative positions of the sections 80, 82.

Figure 5:
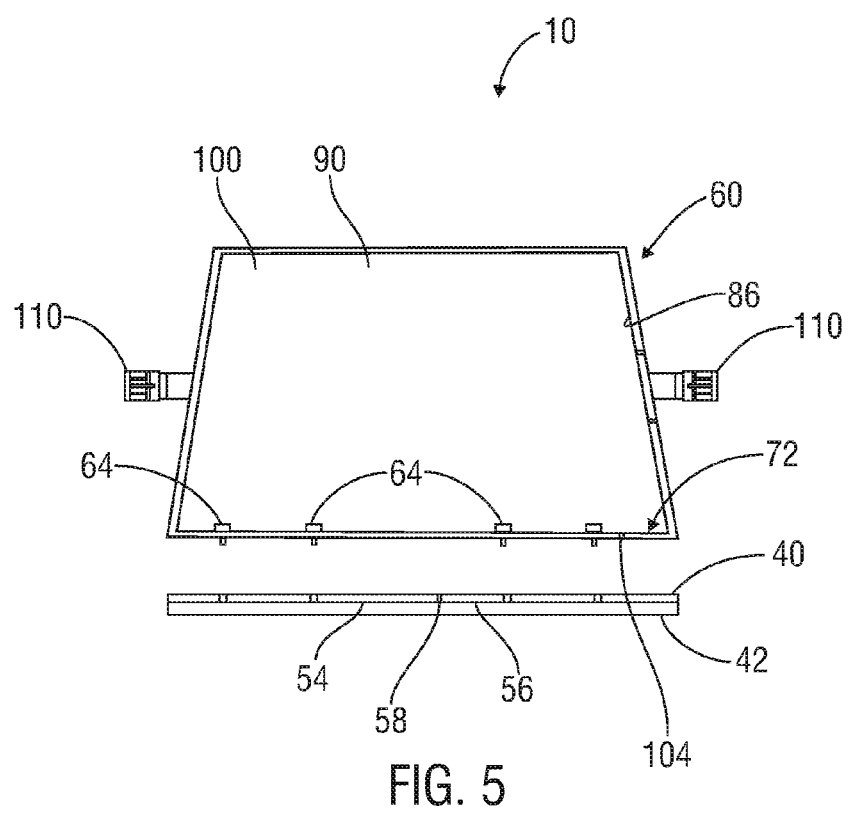
FIG. 5 is another side view of an embodiment of temporary hood in accordance with the present disclosure showing the exemplary upper framework and base frame disengaged.

The upper framework 60 may be coupled to the base frame 40 in any suitable manner. In this embodiment, as shown in FIG. 5, at least one releasable connector 64 is used to connect the upper framework 60 (e.g. bottom frame section 72) to the base frame 40. The connector 64 may have any suitable configuration and operation. For example, the connectors 64 may be bolts, spring-loaded pins, cotter pins, etc. Likewise, the upper framework 60 may be engaged with the panels 90 in any suitable manner. In this example, the rails 62 have outwardly facing slots 86 into which the panels 90 may be slid.

The panels 90 may have any suitable form, configuration and operation sufficient to releasably engageable the upper framework 60 and form an enclosure around the opening 28. Any desired quantity and construction of panels 90 may be used. In the present embodiment, for example, the panels 90 are planar sheets of sheet metal or PVC. In this embodiment, as shown in FIG. 2, five panels 90 are used, including a front panel 92, a rear panel 94, a top panel 96 and first and second side panels 98, 100. However, other embodiments may use more or less panels 90. For example, if the hood 10 includes an inverted-V, or tent, shaped upper framework 60, a top panel may not be included.

Referring to FIG. 4, the panels 90 may engage the upper framework 60 in any suitable manner. In this embodiment, the panels 90 slideably engage the corresponding outwardly-facing slots 86 of the upper framework 60. In FIG. 4, the illustrated side panel 100 is shown being moved along the path 106 in the slots 86 of the second side section 76 of the framework 60. If desired, one or more locking mechanisms 104 (e.g. FIG. 5) may be included to temporarily secure the desired position of the panels 90 relative to the upper framework 60. The locking mechanism 104 may have any suitable form, configuration and operation. For example, depending upon the application, the locking mechanism 104 may be a spring-loaded pin, cotter pin or bolt.

Figure 6:
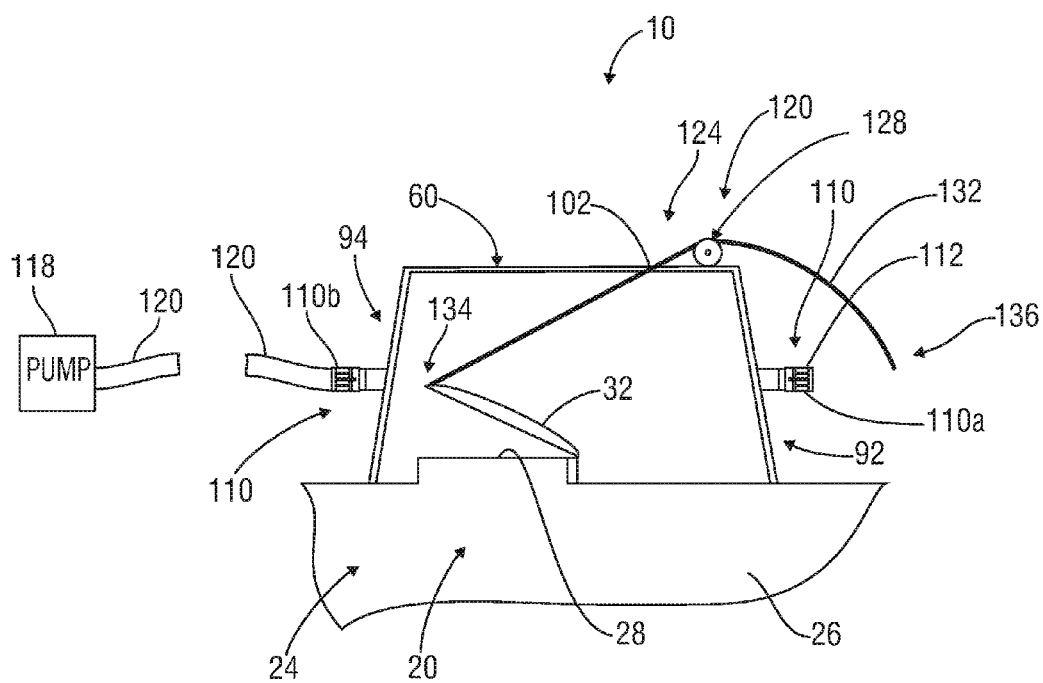
FIG. 6 is yet another a side view of an embodiment of temporary hood having an exemplary opener in accordance with the present disclosure.

Referring now to FIG. 6, the temporary hood 10 may include at least one vapor discharge outlet 110 in fluid communication with the material storage compartment 20 when the cover 32 is opened. The discharge outlet(s) 110 may have any suitable form, configuration and operation. In this example, the discharge outlet 110 is a three inch female cam lock 112. Any desired number of discharge outlets 110 may be disposed on any desired part of the hood 10. In this embodiment, a first discharge outlet 110a is associated with the front panel 92 and a second discharge outlet 110b is associated with the rear panel 94.

The exemplary discharge outlet 110 is used to channel vapors exiting the material storage compartment 20 to a desired destination, such as a collection tank (not shown). In this embodiment, each outlet 110 may be fluidly coupled to one or more vacuum pump 118, such as via a hose 120, to allow the capture of vapors exiting from the opening 28 when the cover 32 is opened. During operations with the present embodiment, a vacuum or negative pressure differential is created under the hood 10 to allow the suction of vapors from the material storage compartment 20 by the vacuum pump 118. The pressure differential can be created in any suitable manner. For example, one or more of the panels 90 may be slightly opened.

Still referring to FIG. 6, the temporary hood 10 may be equipped with an opener 120 for remotely opening the cover 32 of the material storage compartment 20 when the hood 10 is engaged over the opening 28 and cover 32. The opener 120 may have any suitable form, configuration and operation. For example, the opening 120 may include a pulley/cord system 124 that can be actuated to open and close the cover 32 remotely when the hood 10 is engaged with the vessel 24. In the present embodiment, one or more pulley wheels 128 are shown coupled to the outside surface 97 (e.g. FIG. 2) of the top panel 96. The exemplary pulley wheel 128 engages a cord 132 coupled at one end 134 to the cover 32 and extending through an orifice 102 formed in the top panel 96. The pulley wheel 128 and cord 132 may have any suitable form, configuration and operation. For example, the cord 132 may be a nylon rope and the pulley wheel may be a standard, commercially available pulley. In this example, the cord 132 is configured to be selectively pulled at its other end 136 (or any other desired location) and drawn over the pulley wheel 128 away from the opening 28 to open the cover 32 after the temporary hood 10 is installed onto the vessel 24. If desired, the cover 32 may be secured in an open position by maintaining sufficient tension on the cord 132 and closed releasing such tension. In other embodiments, the pulley wheel 128 may be secured to a different component of the temporary hood 10.

In accordance with the present embodiment, the base frame 40, upper framework and 60 and panels 90 are easily installed onto and removed from the vessel 24 and configured to prevent the release of unacceptable quantities of vapors into the atmosphere from the material storage compartment 20, such as during off-loading of material, fluids or a combination thereof from the compartment 20. In many applications, the use of the temporary hood 10 may support a safe work environment around the vessel 24 during use thereof.

In some embodiments, the temporary hood 10 may be custom installed in the vessel 24 to fit the particular operations and/or the type, shape, configuration and dimensions of the vessel 24 or one or more of its components. For example, the width and/or length of the base frame 40, the height and/or width of the upper framework 60 and/or the size of the panels 90 may be adjusted to accommodate the particular vessel 24 and its components.

Referring back to FIG. 1, in an exemplary method of installing the illustrated temporary hood 10, the base frame 40, the upper framework 60, panels 90, or a combination thereof may be adjusted in size or selected to fit the particular vessel 24 and operation. The exemplary base frame 40 is positioned upon the vessel 24 around the opening 28, such as described above. If desired one or more seal member 42 may be sandwiched between the base frame 40 and vessel 24. A strap 44 or other connecting device may be used to secure the base frame 40 (and seal member(s) 42, if included) in position, such as described above.

The illustrated panels 90 (e.g. FIGS. 2 & 4) may be installed in the upper framework 60 and the upper framework 60 engaged with the base frame 40 over the opening 28 and cover 32 (FIGS. 1 & 5). Referring to the embodiment of FIG. 6, one or more vapor discharge outlets 110 may be fluidly coupled to a vacuum pump 118 (e.g. FIG. 6). If the hood 10 includes an opener 120, it may be actuated to open the cover 32. The vacuum pump 118 may be turned on to capture vapors exiting the material storage compartment 20.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods that may be described above or claimed herein and any other methods which may fall within the scope of the appended claims can be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

The invention claimed is:

1. A temporary hood for capturing vapors exiting from a material storage compartment of a vessel when the compartment is opened, the vessel having an opening into the top of the material storage compartment and a cover for covering and uncovering the opening, the temporary hood comprising:
    a base frame configured to extend around the opening and be releasably secured to the vessel;
    an upper framework configured to be releasably coupled to said base frame and extend upwardly from the vessel around the opening;
    at least one releasable connector configured to connect said upper framework and said base frame;
    a plurality of planar panels releasably engageable with said upper framework, said panels arranged and adapted to act as walls around the opening to enclose the opening when said panels are engaged with said upper framework;
    an opener operatively associated with at least one of said plurality of panels to open the cover after the temporary hood is installed onto the vessel; and
    at least one vapor discharge outlet associated with at least one of said panels, said vapor discharge outlet configured to fluidly communicate with the material storage compartment of the vessel and a vacuum pump to allow the capture of vapors exiting from the opening when the cover is opened and the temporary hood is engaged with the vessel.

2. The temporary hood of claim 1 wherein said base frame is at least substantially sealingly engaged with the vessel around the opening, further including at least one seal member disposed between said base frame and the vessel.

3. The temporary hood of claim 2 wherein said at least one seal member is constructed of compressible foam rubber.

4. The temporary hood of claim 1 wherein said plurality of panels includes a front panel, a rear panel, a top panel and first and second side panels, said panels being configured to slideably engage said upper framework.

5. The temporary hood of claim 4 wherein a first said vapor discharge outlet is associated with said front panel and a second said vapor discharge outlet is associated with said rear panel.

6. The temporary hood of claim 4 wherein said top panel includes an inner side and an outer side, wherein said opener includes a pulley wheel extending outwardly from said outer side of said top panel and a cord extending over said pulley, through a hole formed in said top panel and coupled at one end to the cover, said cord being configured to be drawn over said pulley away from the opening to open the cover after the temporary hood is installed onto the vessel.

7. The temporary hood of claim 1 wherein said upper framework includes a plurality of rails having slots formed therein.

8. The temporary hood of claim 7 wherein said panels slideably engage said rails of said upper framework.

9. The temporary hood of claim 7 wherein said plurality of rails forms a front section, rear section, top section, bottom section and first and second side sections of said upper framework.

10. The temporary hood of claim 9 wherein said plurality of panels includes a front panel, a rear panel, a top panel and first and second side panels, said panels slideably engaging said slots of said rails forming said front section, rear section, top section and first and second side sections of said upper framework, respectively.

11. The temporary hood of claim 9 wherein said bottom section of said upper framework is configured to engage said lower frame, further wherein said at least one releasable connector includes at least one bolt.

12. The temporary hood of claim 1 wherein said base frame is releasably secured to the vessel with at least one strap.

13. The temporary hood of claim 12 wherein said strap is configured to be wrapped around at least part of said vessel, wherein said base frame includes at least first and second anchor members disposed on opposite sides of the opening when said base frame is positioned around the opening, said anchor members configured to be secured to opposite ends of said strap.

14. The temporary hood of claim 13 wherein said anchor members are hooks.

15. The temporary hood of claim 14 further including first and second spaced apart sets of anchor members.

16. The temporary hood of claim 1 wherein said vapor discharge outlet is a female camlock.

17. The temporary hood of claim 1 wherein said base frame, upper framework and panels are easily installed onto and removed from the vessel and configured to prevent the release of unacceptable quantities of vapors from the material storage compartment into the atmosphere.

18. The temporary hood of claim 1 wherein said upper framework is configured to be adjustable in height and width relative to the opening.

19. The temporary hood of claim 1 further including an opener for remotely opening the cover when the temporary hood is engaged with the vessel over the opening and the cover.

20. The temporary hood of claim 19 wherein said opener includes a pulley wheel extending outwardly from the outside surface of one of said panels and engaged with a cord extending through an orifice in said panel and coupled, at one end, to the cover, said cord being configured to be selectively moved over said pulley away from the opening to open the cover and thereafter selectively moved over said pulley toward the opening to allow the cover to close.

* * * * *